(12) United States Patent
Netsu et al.

(10) Patent No.: US 7,154,839 B2
(45) Date of Patent: Dec. 26, 2006

(54) OPTICAL PICKUP APPARATUS AND SIGNAL RECORDING AND/OR REPRODUCING APPARATUS

(75) Inventors: Naohiro Netsu, Tokyo (JP); Nobuhiko Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 544 days.

(21) Appl. No.: 10/610,995

(22) Filed: Jul. 1, 2003

(65) Prior Publication Data

US 2004/0081062 A1   Apr. 29, 2004

(30) Foreign Application Priority Data

Jul. 4, 2002   (JP) .............................. 2002-196279

(51) Int. Cl.
  *G11B 7/00*   (2006.01)
(52) U.S. Cl. ................................ 369/112.29
(58) Field of Classification Search ............ 369/112.29
  See application file for complete search history.

(56) References Cited

U.S. PATENT DOCUMENTS 5,172,356 A * 12/1992 Kibune ..................... 369/44.14
5,546,373 A * 8/1996 Koyama ...................... 369/120
5,777,960 A * 7/1998 Ohno ....................... 369/44.14
6,201,630 B1 * 3/2001 Balasubramanian ........ 359/245
2004/0131002 A1 * 7/2004 Odajima et al. ........ 369/112.29

FOREIGN PATENT DOCUMENTS

JP   H07-105565 A   4/1995

* cited by examiner

*Primary Examiner*—Wayne Young
*Assistant Examiner*—Van T. Pham
(74) *Attorney, Agent, or Firm*—Finnegan, Henderson, Farabow, Garrett & Dunner, L.L.P.

(57) ABSTRACT

While supporting an optical disc having a recording density that is higher than conventional optical discs by shortening the wavelength of the emitted light and increasing the numerical aperture (NA) of an objective lens, a reduction in the size of an optical pickup apparatus relative to the size of a disc cartridge that houses the optical disc is achieved. The present invention includes a fixed optical system having a built-in light source, and a movable optical system having an objective lens. A parallel light beam that enters the movable optical system from the fixed optical system enters the movable optical system via a light path that is parallel to the direction in which the objective lens is movable and from the side on which a spindle motor is provided.

20 Claims, 6 Drawing Sheets

PRIOR ART

OPTICAL PICKUP APPARATUS AND SIGNAL RECORDING AND/OR REPRODUCING APPARATUS

CROSS REFERENCE TO RELATED APPLICATIONS

The present document claims priority to Japanese Priority Document JP 2002-196279, filed in the Japanese Patent Office on Jul. 4, 2002, the entire contents of which are incorporated herein by reference to the extent permitted by law.

BACKGROUND OF THE INVENTION

1. Field of the Invention

The present invention relates to an optical pickup apparatus for writing or reading information signals on or from an optical disc as an optical recording medium and a signal recording and/or reproducing apparatus equipped with this optical pickup apparatus for recording or reproducing information signals on or from an optical disc.

2. Description of Related Art

Conventionally, an optical pickup apparatus for writing or reading information signals on or from an optical disc as an optical recording medium has been proposed, and a signal recording and/or reproducing apparatus equipped with this optical pickup apparatus for recording or reproducing information signals on or from an optical disc has been proposed.

With respect to such an optical pickup apparatus, it is demanded that it support optical discs having a higher recording density for information signals for which it is necessary that the wavelength of the light emitted by the laser diode serving as a light source be shortened and numerical apertures (NA) of the objective lens be increased.

For example, according to an optical pickup apparatus that is configured using a high numerical aperture objective lens (an optical pickup apparatus for a high density phase change optical disc), which has been proposed in recent years, as shown in FIG. 9, a light beam emitted from a laser diode 101 is shaped into a parallel beam by a collimator lens 102, and is further shaped by an anamorphic prism 103 into a light beam whose light intensity profiles in two orthogonal directions (the light intensity profile of the cross section of the light beam) are substantially equal before entering a beam splitter 104.

The light beam, which has passed through the beam splitter 104, passes through a beam expander for correcting spherical aberration including a concave lens 105 and a convex lens 106, is deflected in a direction normal to an optical disc 109 by a reflecting mirror 107 and enters an objective lens 108. The light beam entering the objective lens 108 is focused on a signal recording surface of the optical disc 109 as a minute light spot by this objective lens 108.

In addition, in order to maintain the intensity of the emitted light from the laser diode 101 constant, the light beam reflected by the beam splitter 104 is received by an optical detector 110 so as to feedback-control the light emission output of the laser diode 101 based on the output of this optical detector 110.

The light beam reflected by the signal recording surface of the optical disc 109 passes through the objective lens 108 again, is deflected by the reflecting mirror 107, passes through the convex lens 106 and the concave lens 105 of the beam expander, and returns to the beam splitter 104. At this beam splitter 104, the reflected light from the optical disc 109 is reflected and deflected, and is focused, by a condenser 111, on a light receiving surface of an optical detector 112.

Optical elements constituting such an optical system are provided in an optical block 113. As shown in FIG. 9 with arrow T, this optical block 113 is operated movably in a tracking direction, where the objective lens 108 moves towards or away from a spindle shaft 114 supporting a center portion of the optical disc 109.

In such an optical pickup apparatus that supports optical discs with a high recording density, providing the anamorphic prism 103 and the beam expander makes the configuration of the optical system complicated and may cause the apparatus to become larger.

Further, in this optical pickup apparatus, because the entire optical block 113 has to be moved in order to access a given information track, quick activation and stopping of the apparatus cannot be achieved and there is the risk that the time taken to access a desired information track becomes longer.

As such, in recent years, for use in a signal recording and/or reproducing apparatus (i.e., a signal recording and/or reproducing apparatus for high density phase change optical discs), there has been proposed an optical pickup apparatus having a configuration in which, as shown in FIG. 10, the laser diode 101 as the light source, the beam splitter 104, and the optical detectors 110 and 112 and the like are provided in a fixed optical block 115, and only optical components such as the objective lens 108 and the reflecting mirror 107 are provided in the movable optical block 113.

According to this optical pickup apparatus, in the fixed optical block 115, a light beam that is emitted from the laser diode 101 is shaped into a parallel light beam by the collimator lens 102, and is further shaped by the anamorphic prism 103 into a light beam whose light intensity profiles in two orthogonal directions (the light intensity profile of the cross section of the light beam) are substantially equal before entering the beam splitter 104. In order to maintain the light emission intensity of the laser diode 101 constant, the light beam reflected by the beam splitter 104 is received by the optical detector 110 so as to feedback-control the light emission output of the laser diode 101 based on the output of this optical detector 110.

The light beam that has passed through the beam splitter 104 is emitted from the fixed optical block 115 and enters the movable optical block 113. Then, in this movable optical block 113, the light beam passes through the beam expander for correcting spherical aberration composed of the concave lens 105 and the convex lens 106, is deflected in a direction normal to the optical disc 109 by the reflecting mirror 107, and enters the objective lens 108. The light beam entering the objective lens 108 is focused on the signal recording surface of the optical disc 109 as a minute light spot by this objective lens 108.

The light beam reflected by the signal recording surface of the optical disc 109 passes through the objective lens 108 again, is deflected by the reflecting mirror 107, passes through the convex lens 106 and the concave lens 105 of the beam expander, is emitted from the movable optical block 113 and enters the fixed optical block 115.

In the fixed optical block 115, the reflected light from the optical disc 109 returns to the beam splitter 104. At this beam splitter 104, the reflected light from the optical disc 109 is reflected and deflected, and is focused, by the condenser 111, on the light receiving surface of the optical detector 112.

In this optical pickup apparatus, in order to access a desired track, as shown in FIG. 10 with arrow T, only the movable optical block 113 need be moved in the tracking direction, whereby the objective lens 108 is moved towards or away from the spindle shaft 114 supporting a center portion of the optical disc 109. Therefore, in this optical pickup apparatus, the optical block 113 can be activated and stopped at high speed and it is possible to shorten the time taken to access a desired information track.

SUMMARY OF THE INVENTION

In a signal recording and/or reproducing apparatus using the optical pickup apparatus that is configured with a fixed optical block and a movable optical block as described above, the optical pickup apparatus is configured in such a manner that, as shown in FIG. 10, the fixed optical block 115 and the movable optical block 113 are aligned in the radial direction of the optical disc 109. Therefore, the fixed optical block 115 is positioned on the outer side of the optical disc 109. Accordingly, the outer housing of this signal recording and/or reproducing apparatus would have to be larger than a disc cartridge 116, in which the optical disc 109 is housed, that is, the outer housing would have to be larger than an area substantially equal to a square circumscribing the optical disc 109 by at least the size of an area for housing the fixed optical block 115.

For example, assuming that the diameter of the optical disc 109 is 50 mm, if one attempted to configure a small signal recording and/or reproducing apparatus, achieving a sufficient reduction in size becomes difficult since the apparatus would become considerably larger than the size of the disc cartridge 116 housing this optical disc 109, namely, approximately 55 mm in both length and width.

A signal recording and/or reproducing apparatus using an optical pickup apparatus of the configuration above is described in the publication of Japanese Patent Application 1995-105565, however, a sufficient reduction in size in relation to the size of a disc cartridge housing an optical disc is not achieved.

The present invention has been made taking the foregoing problems into consideration and provides an optical pickup apparatus that supports an optical disc having a recording density that is higher than is conventional by shortening the light emission wavelength of a light source and increasing the numerical aperture (NA) of an objective lens, and which, at the same time, achieves a sufficient reduction in its size relative to the size of a disc cartridge housing such an optical disc.

In order to resolve the problems above, an optical pickup apparatus according to an embodiment of the present invention may include a fixed optical system having a light source and a collimator lens, and which is fixedly provided in a signal recording and/or reproducing apparatus. The optical pickup apparatus may also include a movable optical system having an objective lens, which is supported such that the optical axis of this objective lens is parallel to a shaft of a spindle motor that rotates an optical disc serving as a recording medium. The objective lens may be movable towards or away from the shaft of the spindle motor, and a parallel light beam from the light source that is emitted from the fixed optical system by way of the collimator lens enters the objective lens. The objective lens focuses this light beam on a signal recording surface of an optical disc that is rotated by the spindle motor. The optical pickup apparatus may also include light detecting means for detecting a reflected light beam, which is the reflection of the light beam focused on the signal recording surface of the optical disc by the objective lens. The parallel light beam that enters the movable optical system from the fixed optical system follows a light path that is parallel to the direction in which the objective lens is capable of moving, and enters the movable optical system from the side on which the spindle motor is provided.

According to this optical pickup apparatus, since the parallel light beam that enters the movable optical system from the fixed optical system follows a light path that is parallel to the direction in which the objective lens is capable of moving, and enters the movable optical system from the side on which the spindle motor is provided, the fixed and movable optical systems can be distributed in a substantially even manner relative to a center portion of the optical disc supported at this center portion by a shaft of the spindle motor, thereby making it possible to easily keep the fixed optical system and the movable optical system within an area corresponding to a disc cartridge housing this optical disc.

In addition, an embodiment of a signal recording and/or reproducing apparatus of the present invention may include a spindle motor for rotating an optical disc serving as a recording medium, and a fixed optical system having a light source and a collimator lens. The signal recording and/or reproducing apparatus may also include a movable optical system having an objective lens, which is supported such that the optical axis of the objective lens is parallel to a shaft of the spindle motor. The objective lens may be movable towards and away from the shaft of the spindle motor, and a parallel light beam from the light source that is emitted from the fixed optical system by way of the collimator lens enters the objective lens. The objective lens focuses this light beam on a signal recording surface of the optical disc rotated by the spindle motor. The recording and/or reproducing apparatus may also include light detecting means for detecting a reflected light beam, which is a reflection of the light beam focused by the objective lens on the signal recording surface of the optical disc; and signal processing means for signal-processing the light detection output from the light detecting means. The parallel light beam that enters the movable optical system from the fixed optical system follows a light path that is parallel to the direction in which the objective lens is capable of moving, and enters the movable optical system from the side on which the spindle motor is provided.

According to this signal recording and/or reproducing apparatus, since the parallel light beam that enters the movable optical system from the fixed optical system follows a light path that is parallel to the direction in which the objective lens is capable of moving, and enters the movable optical system from the side on which the spindle motor is provided, the fixed and movable optical systems can be distributed in a substantially even manner relative to a center portion of the optical disc supported at this center portion by a shaft of the spindle motor, thereby making it possible to easily keep the fixed optical system and the movable optical system within an area corresponding to a disc cartridge housing this optical disc.

Thus, according to an embodiment of the optical pickup apparatus and the recording and/or reproducing apparatus of the present invention, a significant reduction in size as compared to conventional optical pickup apparatuses can be achieved where, for example, each optical system can be kept within a projected area of a cartridge for an optical disc having a diameter of 50 mm or below.

In addition, according to the optical pickup apparatus and the signal recording and/or reproducing apparatus described above, since the movable optical system can be made lighter, seeking speed in the track direction can be made faster. Further, the laser driver, which is a heat source, can be fixedly provided within the signal recording and/or reproducing apparatus, and thus, it is possible to release heat towards the chassis or the like in a desirable fashion.

DESCRIPTION OF THE PREFERRED EMBODIMENTS

Embodiments of the present invention will be described below with reference to the drawings.

Figure 1:
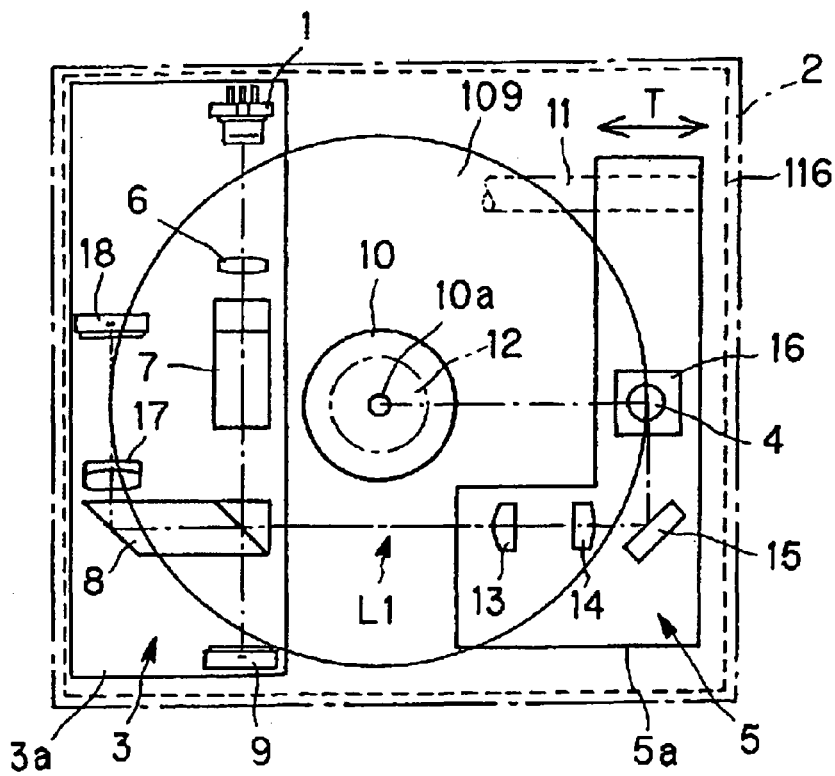
FIG. 1 is a plan view showing the configuration of a main portion of an optical pickup apparatus and a signal recording and/or reproducing apparatus according to an embodiment of the present invention.
Figure 2:
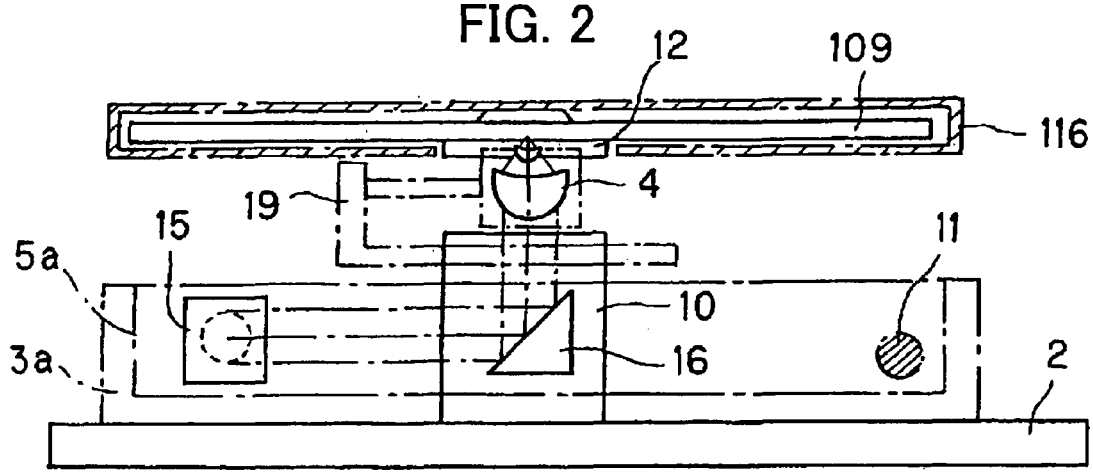
FIG. 2 is a side view showing the configuration of the main portion of the above-mentioned optical pickup apparatus and signal recording and/or reproducing apparatus.

As shown in FIG. 1, an optical pickup apparatus according to an embodiment of the present invention includes: a fixed optical system 3, in which a laser diode 1 as a light source is built-in and which is fixedly provided on a chassis 2 inside a signal recording and/or reproducing apparatus according to an embodiment of the present invention; and a movable optical system 5 which has an objective lens 4, is provided in the signal recording and/or reproducing apparatus so as to be movable on the chassis 2, and into which a light beam emitted from the laser diode 1 enters. The fixed optical system 3 and the movable optical system 5 are provided in a fixed optical block 3a and a movable optical block 5a, respectively. As shown in FIG. 2, the fixed optical block 3a is fixedly provided on the chassis 2.

In the fixed optical system 3, as shown in FIG. 1, the light beam emitted from the laser diode 1 is shaped into a parallel light beam by a collimator lens 6, and is further shaped by an anamorphic prism 7 into a light beam whose light intensity profiles in two orthogonal directions (the light intensity profile of the cross section of the light beam) are substantially equal before entering a beam splitter 8. Then, in order to maintain the light emission intensity of the laser diode 1 constant, the parallel light beam that has passed through the beam splitter 8 is received by an optical detector 9 so as to feedback-control the light emission output of the laser diode 1 based on the output of this optical detector 9.

The parallel light beam reflected at the beam splitter 8 is emitted from the fixed optical block 3a. Further, the parallel light beam that is emitted from the fixed optical block 3a enters the movable optical block 5a.

The movable optical system 5 provided within the movable optical block 5a is supported such that the optical axis of the objective lens 4 is parallel to a shaft of a spindle motor 10 rotating an optical disc 109 as a recording medium in the signal recording and/or reproducing apparatus, namely, a spindle shaft 10a. Further, this movable optical system 5, as shown in FIG. 1 by arrow T, is movable such that the objective lens 4 moves towards or away from the spindle shaft 10a by having the movable optical block 5a guided with a shaft 11 that is provided on the chassis 2.

In addition, as shown in FIG. 2, a disc table 12 is attached to the tip end side of the spindle shaft 10a, and this disc table 12 supports the center portion of the optical disc 109. When the spindle motor 10 is driven and the spindle 10a is rotated, the optical disc 109 rotates with the disc table 12.

As shown in FIG. 1, the parallel light beam that enters the movable optical block 5a hits a mirror 15, which serves as first deflection means, after passing through a beam expander for correcting spherical aberration and which includes a concave lens 13 and a convex lens 14. This mirror 15 deflects the parallel light beam emitted from the fixed optical system 3 and leads it in a direction that crosses the optical axis of the objective lens 4.

As shown in FIG. 2, at the intersection between the light path of the parallel light beam that is deflected by the mirror 15 and the optical axis of the objective lens 4 is placed a reflecting mirror 16 as second deflection means. This reflecting mirror 16 deflects the light beam, which is led by the mirror 15 in a direction that crosses the optical axis of the objective lens 4, in the direction of the optical axis of the objective lens 4, namely, in a direction normal to a principal surface portion of the optical disc 109 and makes it enter the objective lens 4. The parallel light beam that enters the objective lens 4 is focused as a minute light spot on a signal recording surface of the optical disc 109 by this objective lens 4.

The light beam that is reflected by the signal recording surface of the optical disc 109 passes through the objective lens 4 again, is deflected by the reflecting mirror 16, and is further deflected by the mirror 15. Then, as shown in FIG. 1, the light beam passes through the convex lens 14 and the concave lens 13 of the beam expander, is emitted from the movable optical block 5a and returns to the fixed optical block 3a.

In the fixed optical system 3 within the fixed optical block 3a, the reflected light from the optical disc 109 returns to the beam splitter 8. In this beam splitter 8, the reflected light from the optical disc 109 passes through a reflective surface which divides the light beam that goes to the optical detector 9 and the light beam that goes to the movable optical system 5, is reflected and deflected by a surface other than this reflective surface, and is focused on a light receiving surface of the optical detector 18 serving as light detecting means. Thus, this optical detector 18 detects a light beam that is reflected by the signal recording surface of the optical disc 109 after being focused on the above-mentioned signal recording surface by the objective lens 4.

In this optical pickup apparatus, in order to access a predetermined desired information track, as shown in FIG. 1 by arrow T, only the movable optical block 5a need be moved in the tracking direction, where the objective lens 4 moves towards or away from the spindle shaft 10a supporting the center portion of the optical disc 109. Therefore, in this optical pickup apparatus, the movable optical system 5 can be activated and stopped at high speed and it is possible to shorten the time taken to access the desired information track.

Then, in this optical pickup apparatus, a parallel light beam that enters the movable optical system 5 from the fixed optical system 3 enters this movable optical system 5 via a light path L1 parallel to the direction in which the objective lens 4 is movable as shown by arrow T in FIG. 1 and from the side on which the spindle motor 10 is provided. In other words, the fixed optical system 3 and the movable optical system 5 are arranged so as to face each other with the spindle motor 10 in between, such that they are on mutually opposite sides with respect to the spindle motor 10.

Therefore, according to the optical pickup apparatus and the signal recording and/or reproducing apparatus, the fixed optical system 3 and the movable optical system 5 are placed so as to be substantially evenly distributed with respect to the center portion of the optical disc 109 that is supported at its center portion by the spindle shaft 10a, and the fixed optical system 3 and the movable optical system 5 are kept within an area corresponding to a disc cartridge 116 in which this optical disc 109 is housed.

The disc cartridge 116 includes the optical disc 109 and a thin cartridge in which this optical disc 109 is housed rotatably. The cartridge has a principal surface portion substantially corresponding to a square that circumscribes the optical disc 109.

Accordingly, the outer housing of this signal recording and/or reproducing apparatus can be made approximately the size of the disc cartridge 116, namely, approximately the size of an area corresponding substantially to a square that circumscribes the optical disc 109.

For example, if it is assumed that the diameter of the optical disc 109 is 50 mm, in configuring a small-sized signal recording and/or reproducing apparatus, the outer housing of this signal recording and/or reproducing apparatus can be made the size of a disc cartridge 116 in which the optical disc 109 is housed, that is, the outer housing of this recording and/or reproducing apparatus can be made to have a length of approximately 55 mm and a width of approximately 55 mm, thereby making it possible to reduce the size thereof sufficiently.

In this optical pickup apparatus and the signal recording and/or reproducing apparatus incorporating this optical pickup apparatus, a laser driver, which is a drive circuit of the laser diode, becomes a heat source. However, because this laser driver can be fixedly positioned within the signal recording and/or reproducing apparatus together with the fixed optical system 3, it is possible to release heat from this laser driver to the chassis 2 of the signal recording and/or reproducing apparatus and the like in a desirable fashion.

Figure 3:
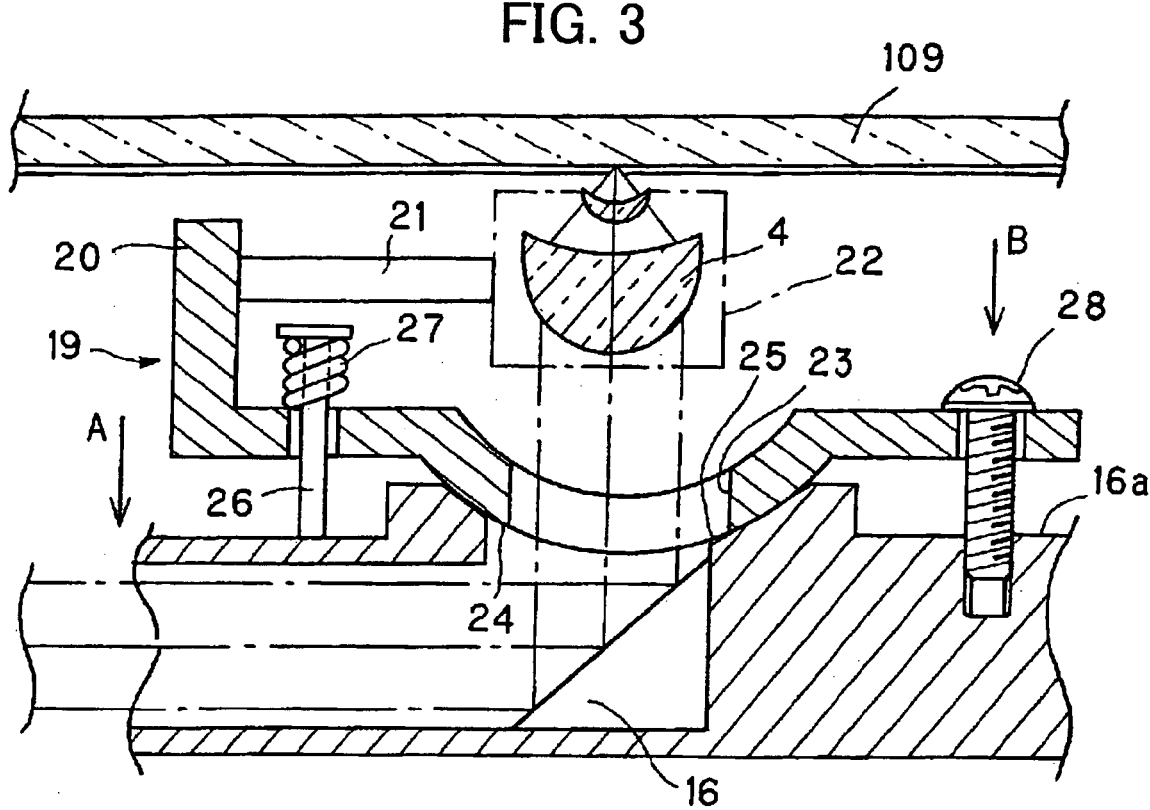
FIG. 3 is a sectional view showing the configuration of a skew adjustment mechanism for the objective lens in the above-mentioned optical pickup apparatus.

The objective lens 4 in this optical pickup apparatus, as shown in FIG. 3, is supported on the movable optical block 5a through a biaxial actuator 19. This biaxial actuator 19 includes an actuator base 20 to be attached on the movable optical block 5a and a lens holder 22 attached to this actuator base 20 through an elastic arm 21 and which holds the objective lens 4. The lens holder 22 is capable of moving within a flat plane including two directions with respect to the actuator base 22, namely, the optical axial direction of the objective lens 4 and the direction orthogonal to this optical axis, while elastically deforming the elastic arm 21.

In this biaxial actuator 19, a focusing coil and a tracking coil (not illustrated) are attached to the lens holder 22. On the actuator base 20, a magnet and a yoke (not illustrated) are attached. The magnet and the yoke form a magnetic circuit which places the focusing coil and the tracking coil inside a magnetic field it forms.

In this biaxial actuator 19, when a drive current is supplied to the focusing coil, due to a mutual interaction between this current and the magnetic field formed by the magnetic circuit, the lens holder 22 is moved in the optical axial direction of the objective lens 4, that is, in a focusing direction. In addition, in this biaxial actuator 19, when a drive current is supplied to the tracking coil, due to a mutual interaction between this current and the magnetic field formed by the magnetic circuit, the lens holder 22 is moved in a direction orthogonal to the optical axial direction of the objective lens 4, that is, in a tracking direction. In other words, in this biaxial actuator 19, by feeding power to the focusing coil and the tracking coil, the lens holder 22 can move in any direction within a flat plane including the optical axial direction of the objective lens 4 and a direction orthogonal to this optical axis.

In this biaxial actuator 19, the light beam that enters the objective lens 4 through the reflecting mirror 16 passes through a transmission hole 23 that is formed in a bottom plate portion of the actuator base 20 before entering the objective lens 4.

In this biaxial actuator 19, a focusing servo operation is performed by supplying to the focusing coil a drive current, which is based on a focus error signal indicating a distance in the optical axial direction of the objective lens 4 between a focal point of the objective lens 4 and the signal recording surface of the optical disc 109. In addition, in this biaxial actuator 19, a tracking servo operation is performed by supplying to the focusing coil and the tracking coil a drive current, which is based on a tracking error signal indicating a distance in the radial direction of the optical disc 109 between a focal point of the objective lens 4 and a recording track that is formed on the signal recording surface of the optical disc 109. By performing such a focusing servo operation and tracking servo operation, the focal point of the objective lens 4 is always formed on a recording track on the signal recording surface of the optical disc 109.

A skew adjustment mechanism for adjusting a skew (inclination) in the objective lens 4 with respect to the light beam that enters the objective lens 4 through the reflecting mirror 16 may be provided in this biaxial actuator 19. This skew adjustment mechanism includes a spherical projection 24 formed in such a manner that the bottom surface portion of the actuator base 20 is spherically expanded to the side of the movable optical block 5a, and a spherical seat 25 formed in a concave spherical shape for supporting the spherical projection 24 on the top surface portion of the movable optical block 5a. Then, the actuator base 20 is pressed towards the side of the movable optical block 5a at one end side as shown by arrow A in FIG. 3 by a compression coil spring 27 that is wound around a supporting column 26 that is provided on the movable optical block 5a. At the same time, the actuator base 20 is supported, as shown by arrow B in FIG. 3, by having the other end side pulled to a certain position towards the side of the movable optical block 5a by a pull screw 28 that is screwed into a screw hole that is formed in the top surface portion of the movable optical block 5a.

In this skew adjustment mechanism, the position of the other end side of the actuator base 20 is determined by the position of the screw head of the pull screw 28, and the spherical projection 24 and the spherical seat 25 are always in contact with each other due to the pressure exerted by the compression coil spring 27. Accordingly, if such pull screws 28 are provided at positions in two or more directions from the optical axis of the objective lens 4, it is possible to adjust the skew of the objective lens 4 with respect to the light beam that enters the objective lens 4 through the reflecting mirror 16 by adjusting the extent to which these pull screws are screwed into the screw holes in the movable optical block 5a.

By virtue of this skew adjustment, a skew in the optical axis of the objective lens 4 with respect to the signal recording surface of the optical disc 109 can be prevented, and occurrences of aberration due to such skew can be suppressed.

Further, in this skew adjustment mechanism, assuming that the reflecting mirror 16 is also attached on the side of the actuator base 20, it is possible to adjust the skew with respect to the signal recording surface of the optical disc 109 while keeping the positional relationship between the objective lens 4 and the reflecting mirror 16 constant. With such skew adjustment, it is possible to prevent the skew, with respect to the signal recording surface of the optical disc 109, in the optical axis of the light beam that enters the objective lens from the reflecting mirror 16, and it is possible to suppress occurrences of aberration due to such skew.

Figure 4:
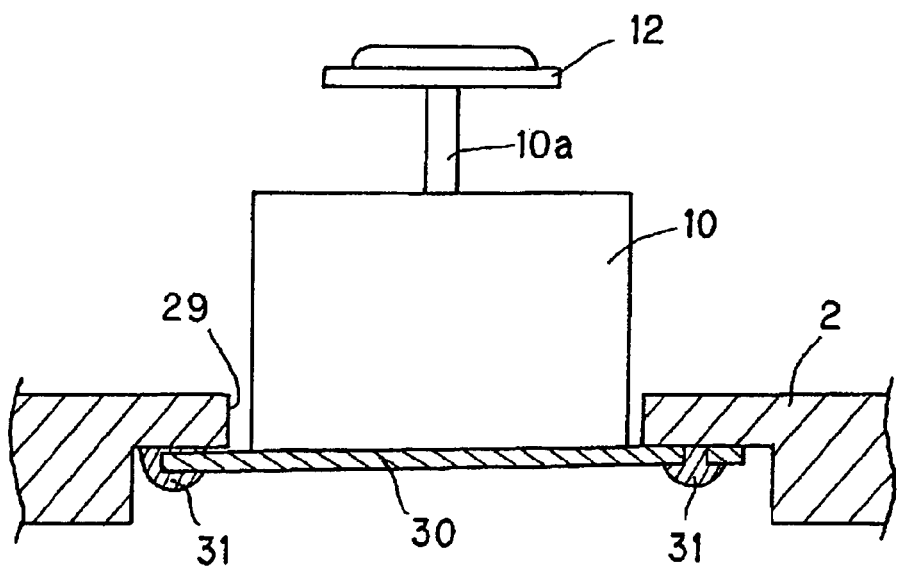
FIG. 4 is a side view showing the configuration of a skew adjustment mechanism for the spindle motor in the above-mentioned signal recording and/or reproducing apparatus.

In addition, in this signal recording and/or reproducing apparatus, by inclining the spindle motor 10 with respect to the chassis 2, the skew in the optical disc 109 with respect to the light beam emitted from the objective lens 4 may be adjusted. In this case, the spindle motor 10, as shown in FIG. 4, is inserted and positioned in a transmission hole 29, which is formed in the center portion of the chassis 2, and is supported by the chassis 2 through an adjustment plate 30 that is attached to the bottom portion of the chassis 2. The adjustment plate 30 can be easily deformed with one end side fixed to the chassis 2, and by deforming this adjustment plate 30, the inclination of the spindle motor 10 with respect to the chassis 2 can be adjusted. Then, in a state where the inclination of the spindle motor 10 with respect to the chassis 2 becomes optimum, the spindle motor 10 can be fixed by fixing a plurality of portions of the adjustment plate 30 to the chassis 2 by solder 31 so that the adjustment plate 30 cannot change its shape.

By way of such an adjustment of the inclination of the spindle motor 10 with respect to the chassis 2, it is possible to prevent a skew in the signal recording surface of the optical disc 109 with respect to the optical axis of the light beam emitted from the objective lens 4, and occurrences of aberration due to such skew can be suppressed.

Figure 5:
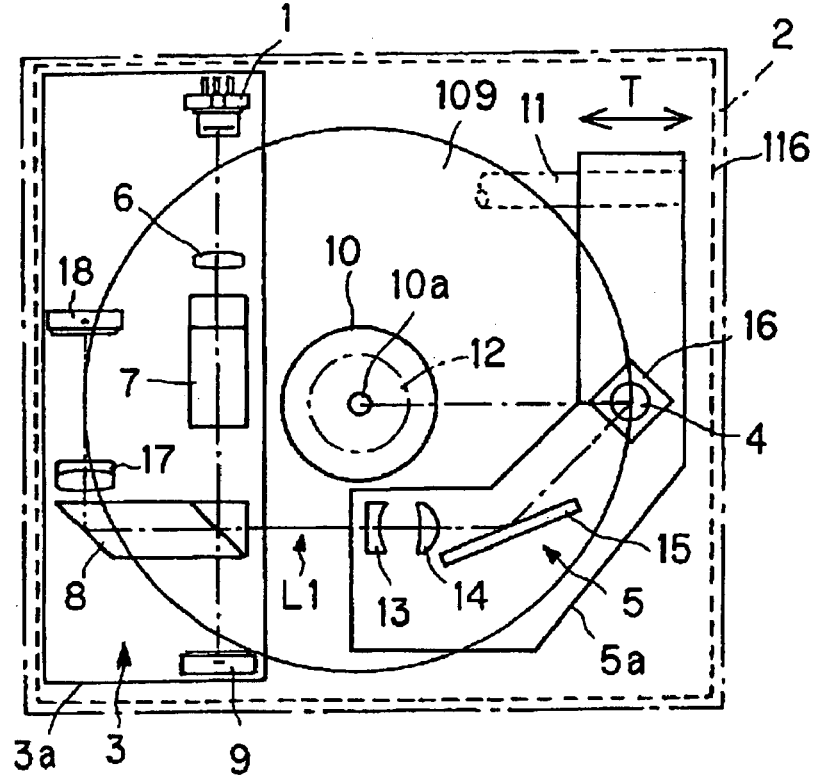
FIG. 5 is a plan view showing another example of the configuration of the above-mentioned optical pickup apparatus (one in which the deflection angle by a first deflection means is made smaller than 90 degrees) and the configuration of a main portion of the signal recording and/or reproducing apparatus.

In the above-described optical pickup apparatus, the angle by which the mirror 15 as the first deflection means deflects the parallel light beam is illustrated as 90 degrees. However, this angle is not limited to 90 degrees, and as shown in FIG. 5, the angle of the mirror 15 with respect to the light beam may be set to be smaller than 90 degrees or larger than 90 degrees.

Figure 6:
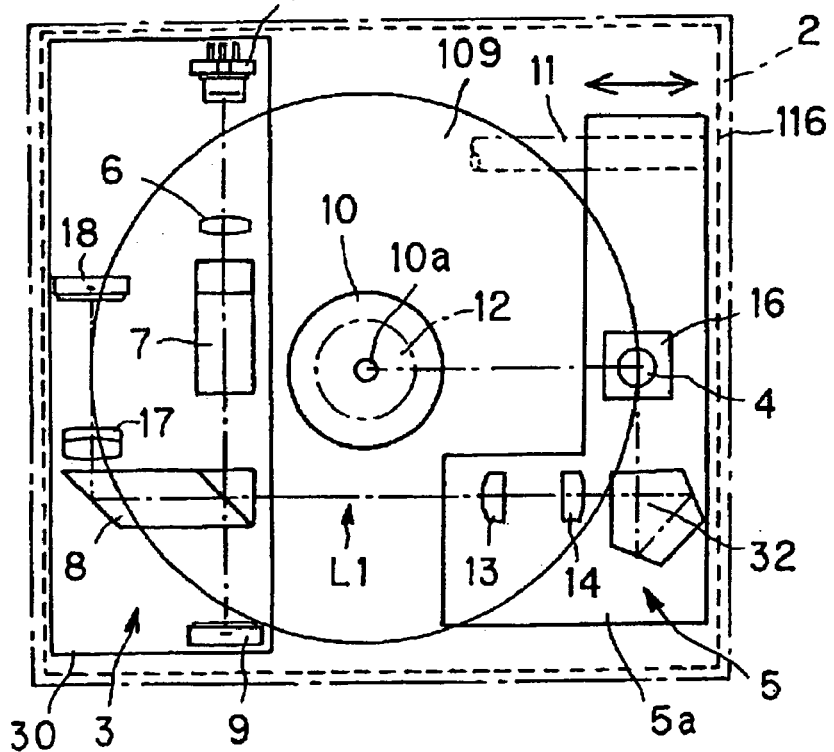
FIG. 6 is a plan view showing another example of the configuration of the above-mentioned optical pickup apparatus (one in which the first deflection means is a pentaprism) and the configuration of a main portion of the signal recording and/or reproducing apparatus.

In addition, the first deflection means, as shown in FIG. 6, may be a pentaprism 32, which internally reflects the incident light beam twice before emitting it. This pentaprism 32 is a prism having the form of a pentangular column. The pentaprism 32 internally reflects the light beam entering from the first of the five peripheral surfaces with the third surface, internally reflects this light beam again with the fifth surface, and emits it from the second surface.

In this pentaprism 32, the angle formed between the incident light beam and the emitted light beam is determined by the angle between the third surface and the fifth surface, by which the light beam is internally reflected, and thus is not affected by angle errors at attachment of the pentaprism 32 in the movable optical block 5a. Accordingly, by making the first deflection means be the pentaprism 32, it is possible to suppress occurrences of optical axis misalignment which are dependent upon the positional accuracy in attaching the pentaprism 32 to the movable optical block 5a, and upon positional misalignment (movement) of the pentaprism 32 in the movable optical block 5a due to environmental changes and changes over time.

Further, in the above-described embodiment, the second deflection means, which is the reflecting mirror 16, may also be a pentaprism.

Figure 7:
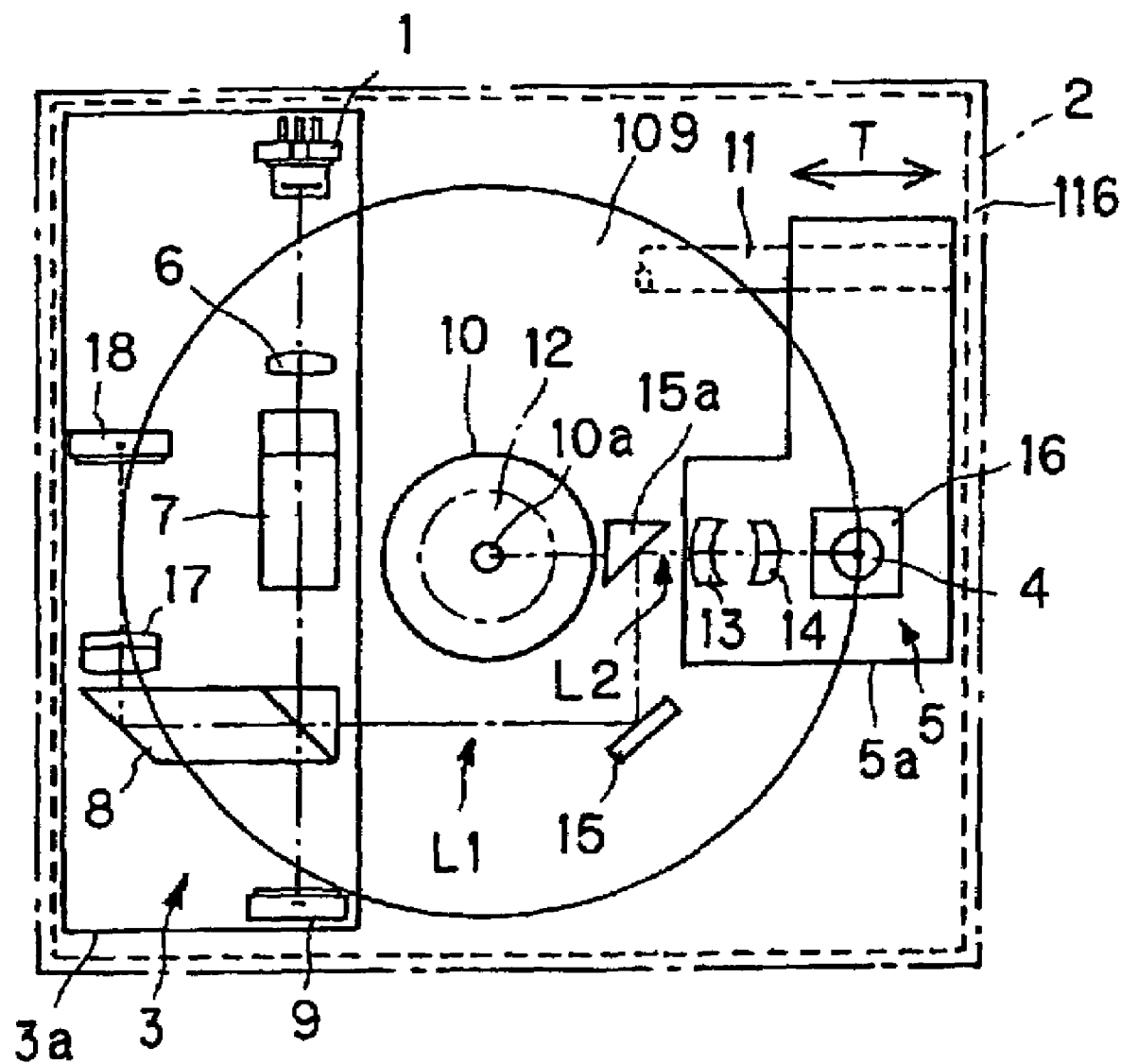
FIG. 7 is a plan view showing another example of the configuration of the above-mentioned optical pickup apparatus (one in which the first deflection means is made a part of a fixed optical system) and the configuration of a main portion of the signal recording and/or reproducing apparatus.

In addition, in the above-described embodiment, the first deflection means is provided in the movable optical system 5. However, the first deflection means, as shown in FIG. 7, may be fixed at a position outside the movable optical system 5, that is, it may be fixed as a part of the fixed optical system 3.

In other words, in this case, the parallel light beam that is emitted from the beam splitter 8 of the fixed optical system 3 is reflected and deflected by the mirror 15 as the first deflection means that is fixed and provided in the signal recording and/or reproducing apparatus. Then, this parallel light beam is further reflected and deflected by a second mirror 15a, which also serves as the first deflection means together with the mirror 15, is led in a direction that crosses the optical axis of the objective lens 4 after traveling through a light path L2 that is parallel to the direction in which the objective lens 4 is movable, and enters the movable optical system 5 from the side on which the spindle motor 10 is provided.

In addition, without using the first and second deflection means as described above, this optical pickup apparatus can be configured such that the parallel light beam, which has traveled through a light path parallel to the direction in which the objective lens 4 is movable, enters the movable optical system 5 from the side on which the spindle motor 10 is disposed. For example, the light beam emitted from the beam expander may be directly led to the objective lens 4 using a light guiding element such as an optical fiber.

Figure 8:
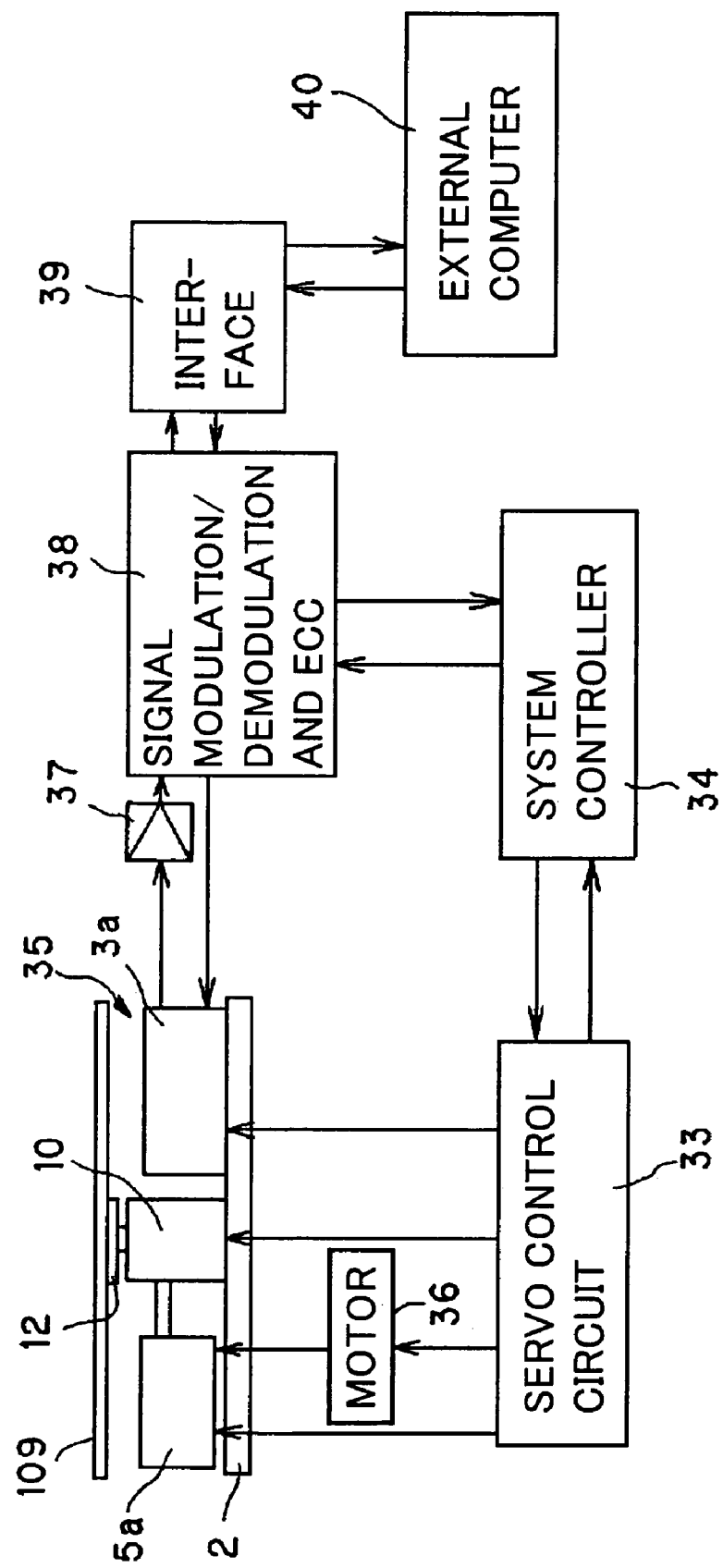
FIG. 8 is a block diagram showing the configuration of the above-mentioned signal recording and/or reproducing apparatus.
Figure 9:
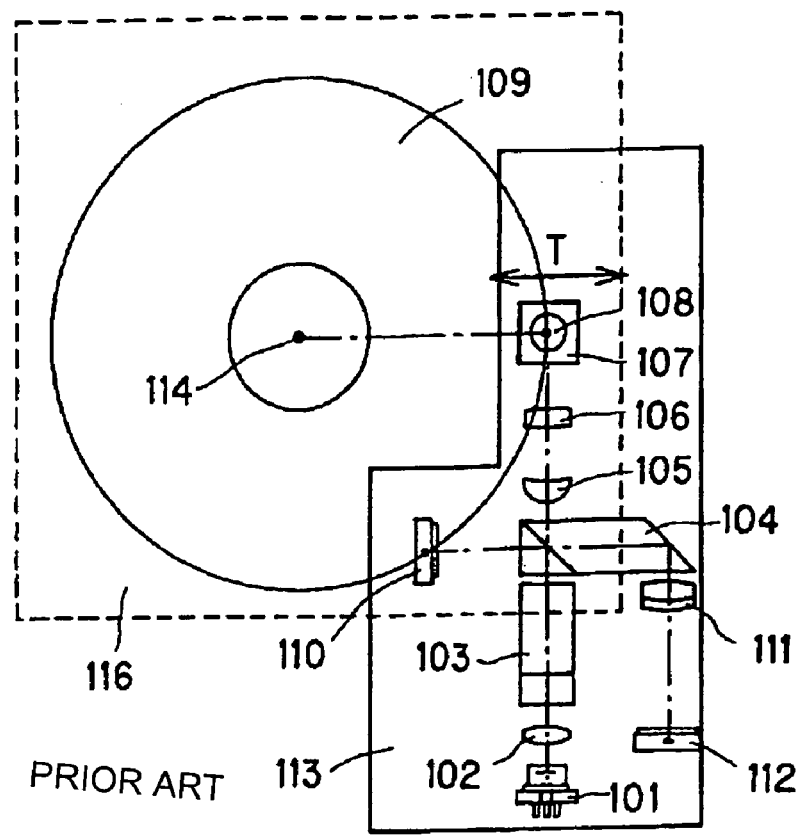
FIG. 9 is a plan view showing the configuration of a main portion of a conventional optical pickup apparatus (one that uses an integrated optical block) and signal recording and/or reproducing apparatus.
Figure 10:
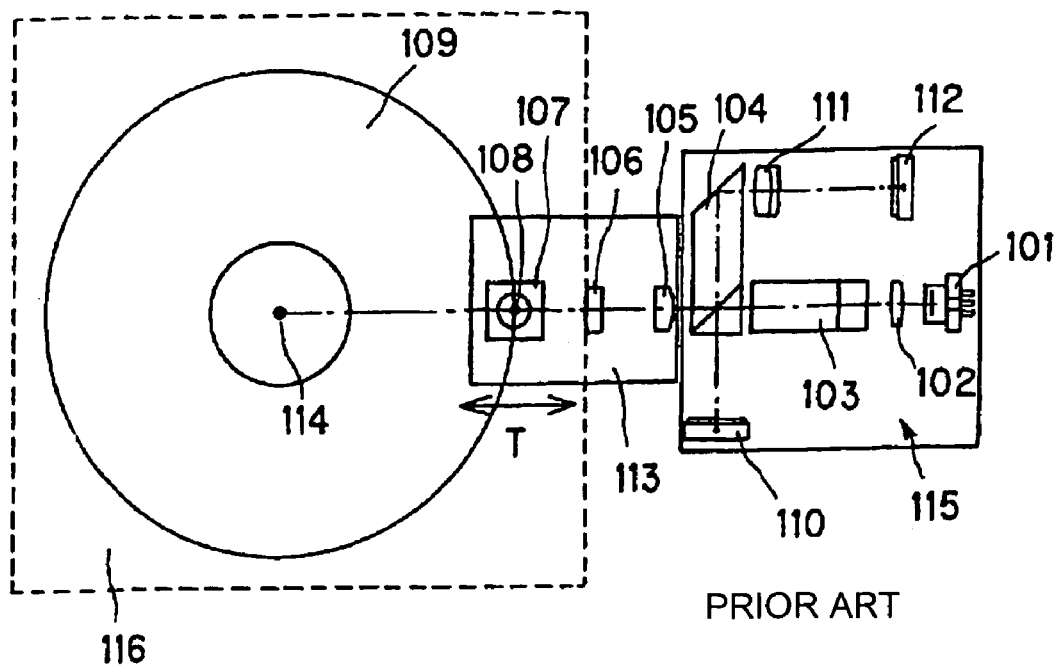
FIG. 10 is a plan view showing the configuration of a main portion of a conventional optical pickup apparatus (one that uses a detached optical block) and signal recording and/or reproducing apparatus.

The signal recording and/or reproducing apparatus according to the present invention, as described above, is equipped with the optical pickup apparatus and the spindle motor 10 on the chassis 2, and further, as shown in FIG. 8, is equipped with an electronic circuit unit having a servo control circuit 33 and a system controller 34 and the like.

In this signal recording and/or reproducing apparatus, the spindle motor 10 is controlled by the servo control circuit 33 and the system controller 34, and is driven at a certain rotation rate. An optical pickup apparatus 35 may write and read information signal on and from the optical disc 109 that is rotated by the spindle motor 10. The movable optical system 5 of this optical pickup apparatus 35 is actuated by a motor 36 in a radial direction of the optical disc 109 that is mounted on the disc table 12. The optical pickup apparatus 35 and the motor 36 are also controlled by the servo control circuit 33.

The optical pickup apparatus 35 irradiates a light beam on the signal recording surface of the optical disc 109, and by detecting a reflected light beam, it reads information signals from the signal recording surface. The signal that is read from the optical disc 109 by the optical pickup apparatus 35 is amplified by a preamplifier 37 and is transmitted to a signal modulation/demodulation and ECC (error correction code) block 38 and the servo control circuit 33. The signal modulation/demodulation and ECC block 38, in accordance with the kind of optical disc that is played, may add modulation, demodulation and ECC to the signal. In addition, the signal modulation/demodulation and ECC block 38, based on the transmitted signal, may generate a focus error signal, a tracking error signal, a track identification signal, an RF signal or the like. The servo control circuit 33 may control the optical pickup apparatus 35 based on the focus error signal, the tracking error signal, the track identification signal, and the RF signal generated by the signal modulation/demodulation and ECC block 38.

A signal that is demodulated by the signal modulation/demodulation and ECC block 38 may be transmitted to an external computer 40 or the like through an interface 39 if this signal is, for example, data for storage. In this case, the external computer 40 or the like is capable of receiving the signal recorded on the optical disc 109 as a reproduced signal.

In addition, the optical pickup apparatus 35, based on the signal that is transmitted from the signal modulation/demodulation and ECC block 38, may irradiate a light beam onto the signal recording surface of the optical disc 109 that is rotated by the spindle motor 10. By way of such irradiation of a light beam, an information signal is written on the signal recording surface of the optical disc 109.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An optical pickup apparatus, comprising:
   a fixed optical system having a light source and a collimator lens, and which is fixedly provided within a signal recording and/or reproducing apparatus;
   a movable optical system having an objective lens, and which is supported such that an optical axis of said objective lens is parallel to a shaft of a spindle motor that rotates an optical disc in said signal recording and/or reproducing apparatus,
   wherein said objective lens is provided so as to be movable towards or away from the shaft of said spindle motor, a parallel light beam, which is emitted from said light source and then from said fixed optical system via said collimator lens, enters said objective lens, and said light beam is focused by said objective lens onto a signal recording surface of said optical disc rotated by said spindle motor; and
   light detecting means for detecting a reflected light beam of the light beam that is focused on the signal recording surface of said optical disc by said objective lens,
   wherein the parallel light beam that enters said movable optical system from said fixed optical system travels through a light path that is parallel to the direction in which said objective lens is movable, and enters said movable optical system from a side of the moveable optical system on which said shaft of said spindle motor is provided.

2. The optical pickup apparatus according to claim 1, further comprising:
   first deflection means for deflecting said parallel light beam that is emitted from said fixed optical system and for leading said parallel light beam in a direction that crosses said optical axis of said objective lens; and
   second deflection means, which is provided in said movable optical system, and which deflects the light beam that is led by said first deflection means in the direction that crosses said optical axis of said objective lens so as to make said light beam enter said objective lens.

3. The optical pickup apparatus according to claim 2, wherein said first deflection means is provided in said movable optical system.

4. The optical pickup apparatus according to claim 3, wherein each of said first and second deflection means is a mirror for reflecting and deflecting an incident light beam.

5. The optical pickup apparatus according to claim 3, wherein said, first deflection means is a pentaprism for twice internally reflecting and emitting an incident light beam.

6. The optical pickup apparatus according to claim 3, wherein said first deflection means deflects an incident light beam by 90 degrees.

7. A signal recording and/or reproducing apparatus, comprising:
   a spindle motor for rotating an optical disc;
   a fixed optical system including a light source and a collimator lens;
   a movable optical system having an objective lens, and which is supported such that an optical axis of said objective lens is parallel to a shaft of said spindle motor, wherein said objective lens is provided so as to be movable towards or away from the shaft of said spindle motor, a parallel light beam, which is emitted from said light source and then from said fixed optical system via said collimator lens, enters said objective lens, and the light beam is focused by said objective lens onto a signal recording surface of said optical disc rotated by said spindle motor;
   light detecting means for detecting a reflected light beam of the light beam that is focused on the signal recording surface of said optical disc by said objective lens; and
   signal processing means for signal-processing a light detection output from said light detecting means,
   wherein the parallel light beam that enters said movable optical system from said fixed optical system travels through a light path that is parallel to the direction in which said objective lens is movable, and enters said movable optical system from a side of the moveable optical system on which said shaft of said spindle motor is provided.

8. The signal recording and/or reproducing apparatus according to claim 7, wherein said fixed optical system and said movable optical system are provided in an area substantially corresponding to a square that circumscribes said optical disc.

9. The signal recording and/or reproducing apparatus according to claim 8, wherein said optical disc has a diameter of approximately 50 mm.

10. The signal recording and/or reproducing apparatus according to claim 7, further comprising:
   first deflection means for deflecting the parallel light beam emitted from said fixed optical system and leading the parallel light beam in a direction that crosses said optical axis of said objective lens; and
   second deflection means, which is provided in said movable optical system, and which deflects the light beam that is led by said first deflection means in the direction that crosses said optical axis of said objective lens so as to make said light beam enter said objective lens.

11. The signal recording and/or reproducing apparatus according to claim 10, wherein said first deflection means is provided in said movable optical system.

12. The signal recording and/or reproducing apparatus according to claim 11, wherein each of said first and second deflection means is a mirror for reflecting and deflecting an incident light beam.

13. The signal recording and/or reproducing apparatus according to claim 11, wherein said first deflection means is a pentaprism for twice internally reflecting and emitting an incident light beam.

14. The signal recording and/or reproducing apparatus according to claim 11, wherein said first deflection means deflects an incident light beam by 90 degrees.

15. The optical pickup apparatus of claim 1, wherein the fixed optical system and the moveable optical system are on opposite sides of the shaft of the spindle motor.

16. The signal recording and/or reproducing apparatus of claim 7, wherein the fixed optical system and the moveable optical system are on opposite sides of the shaft of the spindle motor.

17. The optical pickup apparatus of claim 1, wherein the shaft of the spindle motor is disposed in between the fixed optical system and the movable optical system.

18. The signal recording and/or reproducing apparatus of claim 7, wherein the shaft of the spindle motor is disposed in between the fixed optical system and the movable optical system.

19. The optical pickup apparatus of claim 1, wherein a plane includes a longitudinal axis of the shaft of the spindle motor, intersects the parallel light beam, and is perpendicular to the parallel light beam.

20. The signal recording and/or reproducing apparatus of claim 7, wherein a plane includes a longitudinal axis of the shaft of the spindle motor, intersects the parallel light beam, and is perpendicular to the parallel light beam.

* * * * *